(12) United States Patent
Han

(10) Patent No.: US 11,069,114 B2
(45) Date of Patent: Jul. 20, 2021

(54) IN-VEHICLE AVATAR PROCESSING APPARATUS AND METHOD OF CONTROLLING THE SAME

(71) Applicants: Hyundai Motor Company, Seoul (KR); Kia Motors Corporation, Seoul (KR)

(72) Inventor: Jeong Seok Han, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/700,711

(22) Filed: Dec. 2, 2019

(65) Prior Publication Data

US 2020/0312004 A1    Oct. 1, 2020

(30) Foreign Application Priority Data

Mar. 27, 2019   (KR) .......................... 10-2019-0035153

(51) Int. Cl.
| | |
|---|---|
| *G06T 13/40* | (2011.01) |
| *G06T 13/20* | (2011.01) |
| *G06K 9/00* | (2006.01) |
| *G06T 13/60* | (2011.01) |

(52) U.S. Cl.
CPC .......... *G06T 13/40* (2013.01); *G06K 9/00369* (2013.01); *G06K 9/00832* (2013.01); *G06T 13/205* (2013.01); *G06T 13/60* (2013.01); *G06T 2207/30252* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 2007/0188502 A1* | 8/2007 | Bishop | ................... G06T 13/80 345/473 |
| 2010/0198513 A1* | 8/2010 | Zeng | ..................... G01S 17/931 701/300 |
| 2018/0089880 A1 | 3/2018 | Garrido et al. | |
| 2018/0330178 A1* | 11/2018 | el Kaliouby | ....... G06K 9/00228 |
| 2019/0052842 A1* | 2/2019 | Du | ...................... G06K 9/00979 |
| 2019/0059071 A1* | 2/2019 | Khoryaev | ............... H04W 4/46 |
| 2019/0342739 A1* | 11/2019 | Shah | ................... G01C 21/3492 |
| 2019/0385057 A1* | 12/2019 | Litichever | ................ G06N 3/08 |

* cited by examiner

*Primary Examiner* — YuJang Tswei
(74) *Attorney, Agent, or Firm* — Morgan, Lewis & Bockius LLP

(57) ABSTRACT

An in-vehicle avatar processing apparatus and a method of controlling the same, for generating and outputting an avatar in consideration of a driving situation as well as an external appearance of a vehicle, may include generating first avatar data including at least a vehicle external image by a transmission side device included in a first vehicle, generating second avatar data based on information pertaining to an inside or an outside of a vehicle, by the transmission side device, generating avatar animation by combining the first avatar data and the second avatar data, and outputting the generated avatar animation through an output unit of a reception side device.

20 Claims, 7 Drawing Sheets

IN-VEHICLE AVATAR PROCESSING APPARATUS AND METHOD OF CONTROLLING THE SAME

The present application claims priority to Korean Patent Application No. 10-2019-0035153, filed on Mar. 27, 2019, the entire contents of which is incorporated herein for all purposes by this reference.

BACKGROUND OF THE INVENTION

Field of the Invention

The present invention relates to an in-vehicle avatar processing apparatus and a method of controlling the same, for generating and outputting an avatar in consideration of a driving situation as well as an external appearance of a vehicle.

Description of Related Art

Recently, technologies for extracting feature data based on video input data (e.g., a face image) related to a user to generate an avatar, replacing the user image (e.g., a picture) with the generated avatar, and transmitting the avatar to the outside have been actively developed.

In accordance with recent trends, research has also been steadily conducted into vehicle to everything (V2X) technologies for communication with road infrastructures and other vehicles while driving, such as vehicle-to-vehicle communication, vehicle-to-infrastructure communication of, vehicle-to-pedestrians communication, and the like.

Accordingly, the avatar technology may also be considered to be applied to a vehicle. However, such a general avatar is inevitably dependent upon an externally exposed change such as a facial expression or gesture of a human, and only a change detectable within a detection range of a video input data generating device such as a camera is simply applied to the avatar.

As a result, in a vehicle environment in which an externally exposed change seldom occurs and it is not substantially possible to autonomously and continuously acquire an external image of a user during vehicle driving, there is a problem in that it is difficult to apply a conventional avatar processing method.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus of generating and outputting an avatar applicable to a vehicle and a method of controlling the same.

Various aspects of the present invention are directed to providing an in-vehicle avatar processing apparatus and a method of controlling the same, for generating and outputting an avatar in consideration of a driving situation as well as an external appearance of a vehicle.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance with the present invention, as embodied and broadly described herein, an in-vehicle avatar processing method includes generating first avatar data including at least a vehicle external image, by a transmission side device included in a first vehicle, generating second avatar data based on information pertaining to an inside or an outside of a vehicle, by the transmission side device, generating an avatar animation by combining the first avatar data and the second avatar data, and outputting the generated avatar animation through an output unit of a reception side device.

In another aspect of the present invention, an in-vehicle avatar processing apparatus includes a transmission side device included in a first vehicle and configured to generate first avatar data including at least a vehicle external image and to generate second avatar data based on information pertaining to an inside or an outside of a vehicle, and a reception side device included in a second vehicle and configured to output an avatar animation formed by combining the first avatar data and the second avatar data.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
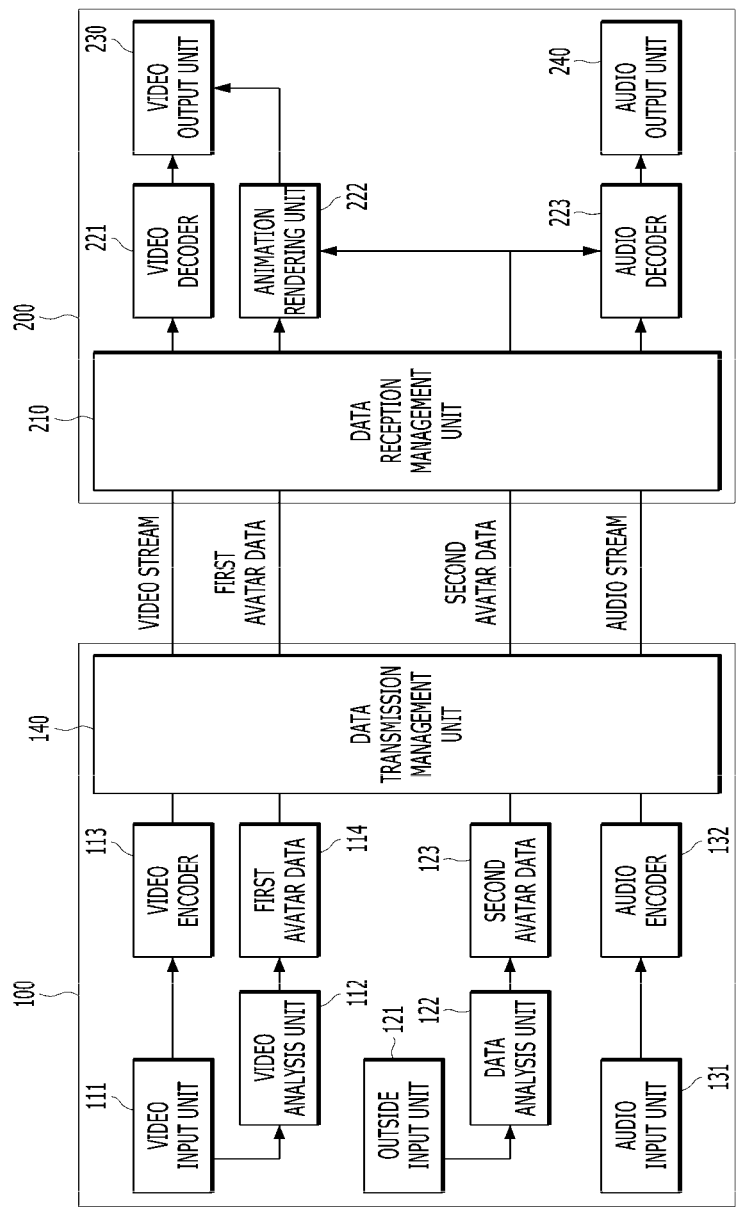
FIG. 1 is a block diagram showing an example of a configuration of an in-vehicle avatar processing apparatus to which embodiments of the present invention are applicable.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present invention are described in detail for those of ordinary skill in the art to easily implement with reference to the accompanying drawings. However, the present invention may be implemented in various different forms and is not limited to these embodiments. To clearly describe the present invention, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

Embodiments of the present invention is directed to providing an in-vehicle avatar processing apparatus and a method of controlling the same, for generating, transmitting, and outputting an avatar using a driving state or a surrounding environment of a vehicle along with an external image of the vehicle.

FIG. 1 is a block diagram showing an example of a configuration of an in-vehicle avatar processing apparatus to which embodiments of the present invention are applicable.

Referring to FIG. 1, the in-vehicle avatar processing apparatus may include a transmission side device 100 and a reception side device 200. The transmission side device 100 may generate avatar source data and may transmit the avatar source data to the reception side device 200, and the reception side device 200 may output an avatar in the predetermined form based on the acquired avatar source data. In the instant case, the transmission side device 100 and the reception side device 200 may be mounted in different respective vehicles and one vehicle may include only one of the transmission side device 100 and the reception side device 200, or may alternatively include both the two devices 100 and 200. For example, the transmission side device 100 and the reception side device 200 may be embodied in a form of one function or one module of a specific controller (e.g., a head unit) or may also be embodied in a form of a separate controller for processing an avatar.

The avatar source data generated by the transmission side device 100 may be transmitted to the reception side device 200 through a predetermined network. For example, the avatar source data may be transmitted directly to a nearby vehicle or a preset vehicle via vehicle-to-vehicle (V2V) communication, or may be transmitted to another vehicle including the reception side device 200 through an infrastructure such as a server, a base station, or an artificial satellite.

Hereinafter, a configuration of each of the transmission side device 100 and the reception side device 200 will be described in detail.

First, the transmission side device 100 may include a video input unit 111, a video analysis unit 112, and a video encoder 113, which are components configured to process video data, and may include an outside input unit 121 and data analysis unit 122, which are components configured to process outside information. The transmission side device 100 may include an audio input unit 131 and an audio encoder 132, which are components configured to process audio data.

The video input unit 111 may acquire external image information related to a vehicle including the transmission side device 100. In the instant case, the external image information related to the vehicle may be acquired from an external server or may also be pre-input when the transmission side device 100 or a vehicle including the transmission side device 100 is manufactured. The procedure of acquiring the external image information from an external server will be described below with reference to FIG. 2. An image contained in the external image information related to the vehicle may be the external image of the vehicle that actually includes the corresponding transmission side device 100, but is not limited thereto. For example, the image may be obtained by processing an actual external image of a corresponding vehicle in the predetermined form, may be a caricature image appropriate for an avatar, or may be a three-dimensional (3D) modeling image. The video input unit 111 may also acquire an image of a driver through an in-cabin camera or the like.

When the external image acquired through the video input unit 111 is a video image and a network environment is an environment for permitting transmission of a video stream, the video image itself may be converted into a form appropriate for the avatar source data, that is, the form of a video stream, by the video encoder 113.

The external image information acquired through the video input unit 111 may be transmitted to the video analysis unit 112, and examination required to generate the avatar source data may be performed. In detail, the video analysis unit 112 may determine or extract a portion required to generate an avatar from the acquired external image information or an image of the driver.

For example, the video analysis unit 112 may analyze the image of the driver, may collect avatar data indicating the movement, depth, and other features such as the facial structure of the driver, and may generate and model an avatar corresponding to the collected data. When the external image acquired through the video input unit 111 corresponds to 3D modeling, the video analysis unit 112 may capture an image viewed at a specific angle required to generate an avatar through rendering, and when the acquired external image includes a plurality of still images viewed from different angles, the video analysis unit 112 may also determine at least one still image required to generate an avatar among the still images.

The video analysis unit 112 may generate first avatar data 114 as the aforementioned analysis result. The first avatar data 114 may include at least one 2D image for generating an animation by generating a 2D image and applying movement and modification to the generated image by an animation rendering unit 222 of the reception side device 200, which will be described below, and instruction information indicating movement/modification to be applied to the corresponding 2D image. For example, the instruction information may include information on displacement of all or portion of a specific 2D image as time elapses.

The outside input unit 121 may receive information pertaining to the outside/inside of the vehicle. An example of the received information may include at least one of a vehicle speed, a steering wheel manipulation amount (or a steering angle), turn signal light information, forward path information, or surrounding weather information. The data analysis unit 122 may determine a driving situation through analysis of extracting feature information data from the information acquired by the outside input unit 121. For example, the data analysis unit 122 may determine attribute information data corresponding to the closest case among a plurality of preset cases, such as whether a vehicle rapidly accelerates/overtakes another vehicle, whether the vehicle brakes, or whether the vehicle slides according to a road situation. The data processing procedure of the data analysis unit 122 will be described in more detail with reference to FIG. 3.

The data analysis unit 122 may generate second avatar data 123 according to the analysis result (i.e., attribute information data). The second avatar data 123 may include at least one of video information or audio information. The video information may include at least one of an image required to embody an animation corresponding to the attribute information data, a surrounding geographic feature image, a weather image, an identification code for identification of the images, or an operation code indicating a modification/movement form to be applied to the images or to the vehicle external image. For example, the video information may include an image required to embody a rotation animation of a steering wheel, information related to an angle of inclination of a vehicle, or the like. The audio information may include at least one of a sound corresponding to a driving situation, such as engine sound or brake sound, or an identification code thereof. The second avatar data 123 may further include positional information related to the vehicle including the transmission side device 100.

The audio input unit 131 may acquire sound for at least one provided avatar, or may acquire sound from inside or outside the vehicle using a microphone included in the vehicle. The sound acquired by the audio input unit 131 may be converted into the form of audio stream data through the audio encoder 132.

Each of the avatar source data, such as the video stream data generated by the video encoder 113, the first avatar data 114 generated by the video analysis unit 112, the second avatar data 123 generated by the data analysis unit 122, or the audio stream data generated by the audio encoder 132, may be transmitted to the outside through a data transmission management unit 140. To the present end, the data transmission management unit 140 may perform at least one of packaging, encryption, or compression to directly receive each of the data by the reception side device 200 or to receive the data through infrastructure.

The reception side device 200 may include a data reception management unit 210 configured to receive the avatar source data transmitted from the transmission side device 100. Upon receiving the avatar source data, the data reception management unit 210 may perform at least a corresponding one of decompression, decoding, or un-packaging on the received source data and may then determine a type of the source data. According to the determined type, the data reception management unit 210 may forward video stream data to a video decoder 221, may forward first avatar data to the animation rendering unit 222, and may forward audio stream data to an audio decoder 223. The data reception management unit 210 may forward video information related to second avatar data to the animation rendering unit 222 and may forward audio information related to the second avatar data to the audio decoder 223.

The video decoder 221 may decode a video stream and may forward the video stream to a video output unit 230. The animation rendering unit 222 may apply the instruction information to the at least one 2D image acquired through the first avatar data to generate avatar animation, may further apply (synthesize) video information related to the second avatar data to the avatar animation to generate final avatar animation, and may forward the final avatar animation to the video output unit 230. When the second avatar data includes positional information related to a vehicle including the transmission side device 100, the animation rendering unit 222 may also change a vehicle external image shape (a front view, a rear view, a side view, or the like) when an animation is generated according to the relative position between a vehicle including the transmission side device 100 and a vehicle including the reception side device 200. For example, when the vehicle including the transmission side device 100 relatively corresponds to a preceding vehicle, the vehicle external image may be an image corresponding to the rear view.

The audio decoder 223 may decode audio stream data to generate a sound signal, may further apply (synthesize) audio information related to the second avatar data to the sound signal to generate a final avatar sound signal, and may forward the final avatar sound signal to an audio output unit 240.

The video output unit 230 may output the image data or the avatar animation forwarded from the video decoder 221 and/or the animation rendering unit 222 in a form of visual information. To the present end, the video output unit 230 may include at least one display device. For example, the video output unit 230 may be embodied in a form of any one of a display of a cluster or a head unit, or a head upwards display.

The audio output unit 240 may receive a sound signal from the audio decoder 223 and may output sound. To the present end, the audio output unit 240 may include at least one speaker.

Needless to say, the aforementioned video output unit 230 and audio output unit 240 may be collectively referred to as an "output unit".

Figure 2:
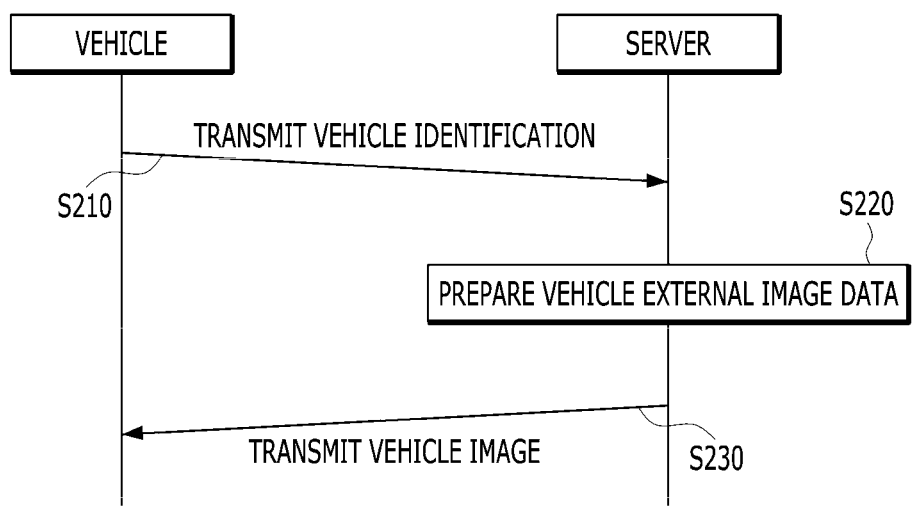
FIG. 2 is a diagram showing an example of a procedure of acquiring a vehicle image of a video input unit according to an exemplary embodiment of the present invention.

FIG. 2 is a diagram showing an example of a procedure of acquiring a vehicle image of a video input unit according to an exemplary embodiment of the present invention.

Referring to FIG. 2, the video input unit 111 of a vehicle may transmit vehicle identification information to a preset server (S210). Here, the vehicle identification information may be a number of a license board of a vehicle or a vehicle identification number, but it not limited to any information as long as it is possible to identify the corresponding vehicle including the transmission side device 100.

The server may prepare vehicle external image data based on the vehicle identification information (S220). In the instant case, the vehicle external image data may be determined based on at least one of a vehicle type, color, or trim option (e.g., whether a spoiler is mounted, a wheel size, a wheel design, whether a sunroof is mounted, whether a body kit is mounted, a shape of an exhaust port, or whether an external antenna is mounted).

When the vehicle external image data is prepared, the server may transmit the vehicle external image data to the vehicle. Accordingly, the video input unit 111 of the transmission side device 100 of the vehicle may acquire external image data.

Hereinafter, a procedure of processing data for analysis by the data analysis unit 122 will be described with reference to FIG. 3.

Figure 3:
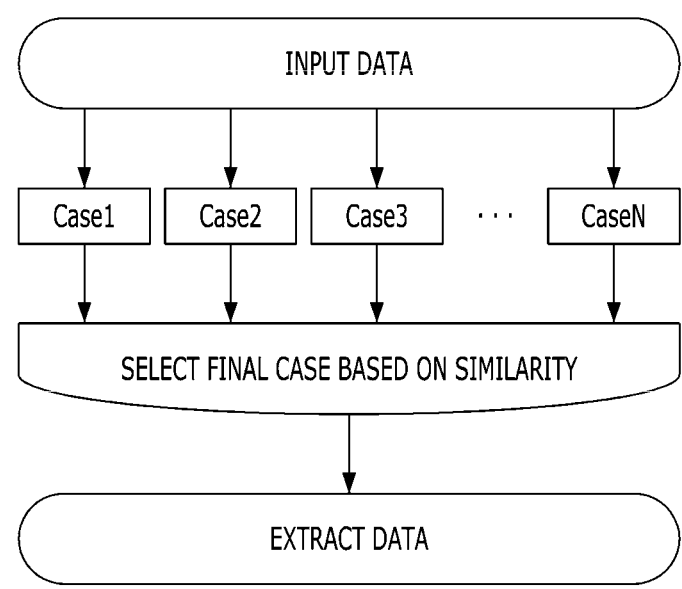
FIG. 3 is a diagram showing an example of a procedure of processing data for analysis of a data analysis unit according to an exemplary embodiment of the present invention.

FIG. 3 is a diagram showing an example of a procedure of processing data for analysis of a data analysis unit according to an exemplary embodiment of the present invention.

Referring to FIG. 3, the data analysis unit 122 may compare various input data inside/outside the vehicle with a plurality of predetermined scenarios (i.e., Case 1 to Case N) to determine similarity therebetween. For example, the plurality of scenarios may include i) a corresponding lane change case when a turn signal is operated and then a vehicle accelerates, ii) a corresponding off-ramp entrance case when a turn signal is operated in front of an off-ramp of an expressway and a vehicle decelerates, or the like, but is not limited thereto.

Accordingly, the data analysis unit 122 may select the most similar case among the plurality of cases based on similarity and may extract data corresponding to the corresponding case as avatar attribute data.

Figure 4:
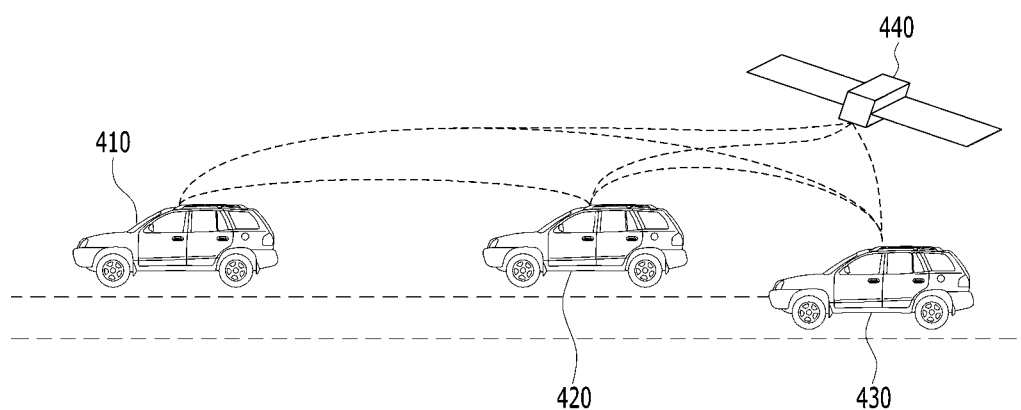
FIG. 4 is a diagram showing an example of a case in which an avatar is transmitted to the outside according to an exemplary embodiment of the present invention.

FIG. 4 is a diagram showing an example of a case in which an avatar is transmitted to the outside according to an exemplary embodiment of the present invention.

In FIG. 4, it is assumed that a preceding vehicle 410 includes at least one transmission side device 100, and nearby vehicles 420 and 430 thereof may each include at least the reception side device 200.

The vehicle 410 including the transmission side device 100 may generate avatar source data corresponding to a corresponding event when the event occurs and may transmit the avatar source data to following vehicles 420 and 430. For example, as described above with reference to FIG. 3, when a situation such as cut-in or sudden stop is detected to occur based on a predetermined case, the avatar source data may be automatically transmitted to a vehicle which is currently driven within a specific distance. Needless to say, the avatar may be transmitted according to a driver command rather than being automatically transmitted based on an event. When the avatar is transmitted according to the driver command, an image-based avatar of the driver may also be transmitted instead of an avatar based on a vehicle shape, or may be transmitted therewith.

The avatar source data may be transmitted directly to a nearby vehicle via V2V communication or one vehicle 420 may first receive avatar source data and may forward the data to the nearby vehicle 430 of the corresponding vehicle 420 again via V2V communication. The avatar source data may also be transmitted through an infrastructure 440.

Hereinafter, a detailed shape of an avatar will be described with reference to FIG. 5, FIG. 6 and FIG. 7.

Figure 5:
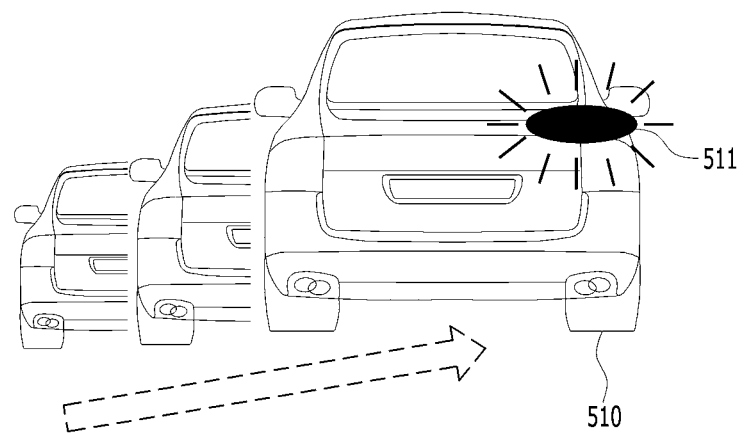
FIG. 5 illustrates a shape of an avatar according to an exemplary embodiment of the present invention.

FIG. 5 illustrates a shape of an avatar according to an exemplary embodiment of the present invention.

In FIG. 5, it is assumed that, as a vehicle accelerates and a turn signal light is turned on, the data analysis unit 122 determines overtake attributes, and extracts attribute data corresponding to the overtake attributes (e.g., a turn signal is turned on+a vehicle is moved in a lateral direction) to generate the second avatar data, and the first avatar data includes an image of the rear of a vehicle. The reception side device 200 that receives the avatar source data generated using the present method may combine a turn signal light and lateral moving code included in video data of the second avatar data with the image of the rear of the vehicle included in the first avatar data to generate an avatar animation in which a vehicle 510 moves in the direction of the arrow while turning on a turn signal 511 and may output the avatar animation through the video output unit 230, as shown in FIG. 5.

Figure 6:
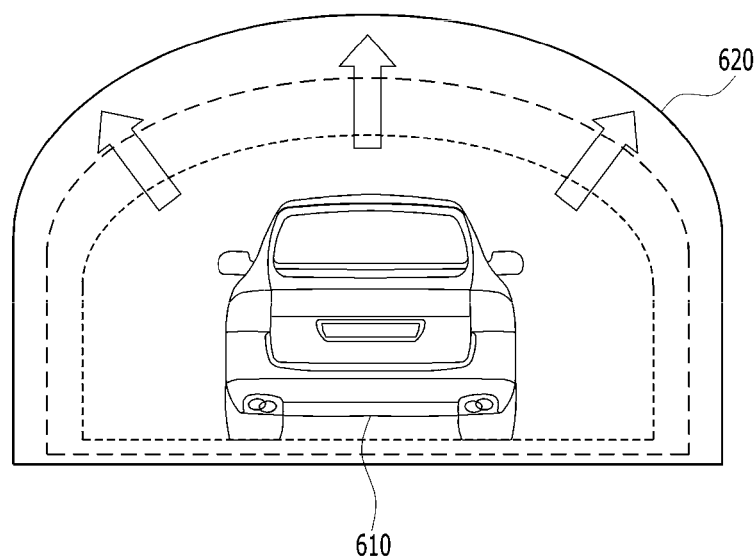
FIG. 6 is a diagram showing another example of a shape of an avatar according to an exemplary embodiment of the present invention.

FIG. 6 is a diagram showing another example of a shape of an avatar according to an exemplary embodiment of the present invention.

In FIG. 6, it is assumed that the data analysis unit 122 determines forward tunnel entrance attribute based on vehicle path map data, and extracts attribute data (e.g., a tunnel image and enlargement visual effect code) corresponding to the forward tunnel entrance attribute to generate second avatar data, and that the first avatar data includes an image of the rear of the vehicle. The reception side device 200 that receives the avatar source data generated using the present method may combine the tunnel image and the enlargement visual effect code included in video data of the second avatar data with an image of the rear of the vehicle included in the first avatar data to generate an avatar animation in which a vehicle 610 is positioned in the middle of an image of a tunnel 620, which is gradually enlarged, and enters the tunnel 620, and may output the avatar animation through the video output unit 230, as shown in FIG. 6.

Figure 7:
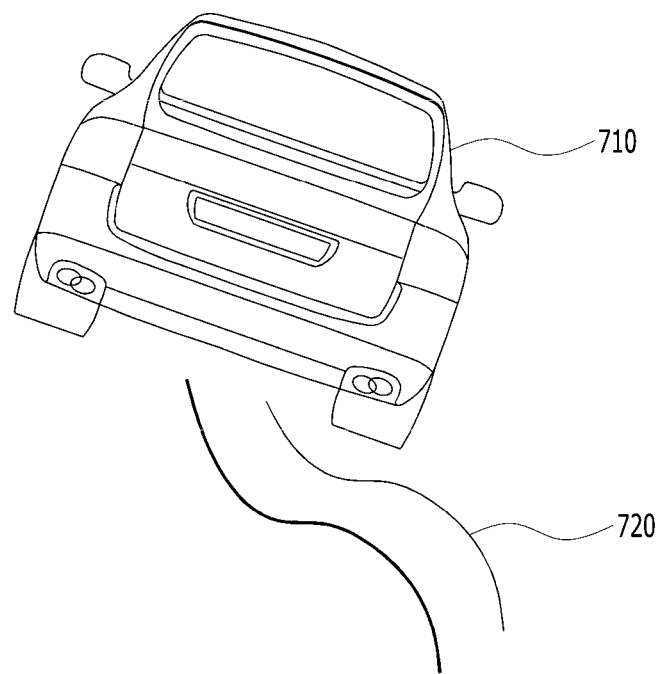
FIG. 7 is a diagram showing another example of a shape of an avatar according to an exemplary embodiment of the present invention.

FIG. 7 is a diagram showing another example of a shape of an avatar according to an exemplary embodiment of the present invention.

In FIG. 7, it is assumed that the data analysis unit 122 determines attributes whereby a vehicle slips without gripping based on vehicle behavior data, and extracts attribute data corresponding to the attributes (e.g., a vehicle inclination code and a slip image) to generate second avatar data, and that the first avatar data includes an image of the rear of a vehicle. The reception side device 200 that receives the avatar source data generated using the present method may synthesize an slip image included in video data of the second avatar data with an image of the rear of the vehicle included in the first avatar data and may apply the inclination code to the image of the rear of the vehicle to generate an avatar animation having a trajectory 720 in which a vehicle 710 slips while being inclined, and may output the avatar animation through the video output unit 230, as shown in FIG. 7.

The in-vehicle avatar processing apparatus related to at least an exemplary embodiment of the present invention configured as described above may generate and output an avatar in consideration of a driving situation as well as an external appearance of a vehicle.

The avatar according to exemplary embodiments of the present invention may be transmitted to a nearby vehicle via V2X communication, and thus a driver of the nearby vehicle may intuitively recognize a situation of a vehicle that generates the avatar.

It will be appreciated by persons skilled in the art that the effects that could be achieved with the present invention are not limited to what has been described hereinabove and other advantages of the present invention will be more clearly understood from the detailed description.

The aforementioned present invention can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An in-vehicle avatar processing method comprising:
   generating first avatar data including at least an exterior image of a first vehicle, by a transmission side device included in the first vehicle;
   generating second avatar data based on information pertaining to an inside or an outside of a vehicle, by the transmission side device;
   generating a vehicle avatar animation of the first vehicle by combining the first avatar data and the second avatar data; and
   outputting the generated vehicle avatar animation through an output unit of a reception side device.

2. The in-vehicle avatar processing method of claim 1, further including:
   transmitting the first avatar data and the second avatar data to the reception side device included in at least a second vehicle from the transmission side device,
   wherein the generating the vehicle avatar animation is performed by the reception side device.

3. The in-vehicle avatar processing method of claim 2,
   wherein the transmitting further includes transmitting audio stream data; and
   wherein the outputting includes outputting a sound by combining the audio stream data and audio information included in the second avatar data.

4. The in-vehicle avatar processing method of claim 1, wherein the generating the vehicle avatar animation is performed by the transmission side device, and includes transmitting the generated vehicle avatar animation to the reception side device from the transmission side device.

5. The in-vehicle avatar processing method of claim 1, wherein the generating the first avatar data includes:
   transmitting vehicle identification information related to the first vehicle to a preset server from the first vehicle;
   preparing the at least a vehicle exterior image corresponding to the first vehicle based on the vehicle identification information by the preset server; and
   transmitting the provided vehicle exterior image to the first vehicle by the preset server.

6. The in-vehicle avatar processing method of claim 1, wherein the generating the second avatar data includes:
   receiving the information pertaining to the inside or the outside of the vehicle;
   extracting attribute information data from the received information; and
   generating the second avatar data including at least one of audio information or video information corresponding to the attribute information data.

7. The in-vehicle avatar processing method of claim 6, wherein the extracting the attribute information data includes:
   comparing the received information with a plurality of preset cases;
   determining a similarity with respect to each of the plurality of preset cases; and
   extracting attribute information data corresponding to one of the plurality of cases based on the determined similarity.

8. The in-vehicle avatar processing method of claim 6,
   wherein the video information includes at least one of an image required to embody an animation corresponding to the attribute information data, a surrounding geographic feature image, a weather image, an image identification code, or an operation code, and
   wherein the audio information includes at least one of a sound corresponding to a driving situation or a sound identification code.

9. The in-vehicle avatar processing method of claim 6, wherein the generating the vehicle avatar animation includes applying a visual effect corresponding to the video information included in the second avatar data to the at least a vehicle exterior image included in the first avatar data.

10. A non-transitory computer readable recording medium having recorded thereon a program for executing the method of claim 1.

11. An in-vehicle avatar processing apparatus comprising:
    a transmission side device included in a first vehicle and configured to generate first avatar data including at least an exterior image of the first vehicle and to generate second avatar data based on information pertaining to an inside or an outside of a vehicle; and
    a reception side device included in a second vehicle and configured to output a vehicle avatar animation of the first vehicle formed by combining the first avatar data and the second avatar data.

12. The in-vehicle avatar processing apparatus of claim 11,
    wherein the transmission side device is configured to transmit the first avatar data and the second avatar data to the reception side device; and
    wherein the reception side device is configured to generate the vehicle avatar animation by combining the first avatar data and the second avatar data.

13. The in-vehicle avatar processing apparatus of claim 12,
    wherein the transmission side device includes an audio encoder, and
    wherein the reception side device includes an audio decoder configured to generates a sound formed by combining audio stream data and audio information included in the second avatar data.

14. The in-vehicle avatar processing apparatus of claim 11,
    wherein the transmission side device is configured to generate the vehicle avatar animation by combining the first avatar data and the second avatar data and to transmit the generated vehicle avatar animation to the reception side device.

15. The in-vehicle avatar processing apparatus of claim 11,
wherein the transmission side device is configured to transmit vehicle identification information related to the first vehicle to a preset server, and includes a video input unit configured to acquire the at least a vehicle exterior image corresponding to the first vehicle provided based on the vehicle identification information from the preset server.

16. The in-vehicle avatar processing apparatus of claim 11, wherein the transmission side device includes:
an outside input unit configured to receive the information pertaining the inside or the outside of the vehicle; and
a data analysis unit configured to extract attribute information data from the received information, and to generate the second avatar data including at least one of audio information or video information corresponding to the attribute information data.

17. The in-vehicle avatar processing apparatus of claim 16,
wherein the data analysis unit is configured to compare the received information with a plurality of preset cases, determines a similarity with respect to each of the plurality of preset cases, and extracts attribute information data corresponding to one of the plurality of cases based on the determined similarity.

18. The in-vehicle avatar processing apparatus of claim 16,
wherein the video information includes at least one of an image required to embody an animation corresponding to the attribute information data, a surrounding geographic feature image, a weather image, an image identification code, or an operation code, and
wherein the audio information includes at least one of sound corresponding to a driving situation or a sound identification code.

19. The in-vehicle avatar processing apparatus of claim 16,
wherein the reception side device includes an animation rendering unit configured to apply a visual effect corresponding to the video information included in the second avatar data to the at least a vehicle exterior image included in the first avatar data.

20. The in-vehicle avatar processing apparatus of claim 19,
wherein the animation rendering unit is configured to change the at least a vehicle exterior image according to a relative position between the first vehicle and the second vehicle.

* * * * *